Oct. 27, 1931.  H. D. FLEGEL  1,829,442

ICE CREAM DISHER

Filed Aug. 27, 1926

Inventor
Harrison D. Flegel
By Williams, Bradbury,
McCaleb & Hinkle
Attorneys

Patented Oct. 27, 1931

1,829,442

UNITED STATES PATENT OFFICE

HARRISON D. FLEGEL, OF RACINE, WISCONSIN, ASSIGNOR, BY MESNE ASSIGNMENTS, TO HAMILTON BEACH MANUFACTURING COMPANY, OF RACINE, WISCONSIN, A CORPORATION OF WISCONSIN

ICE CREAM DISHER

Application filed August 27, 1926. Serial No. 131,827.

My invention relates to new and useful improvements in ice cream dishers having hemispherical bowls which are provided with semi-circular scraping elements as means for dislodging the ice cream from the bowls.

The object of this invention is to provide an article of the class described which may be economically manufactured and is of such simplicity that it will insure perfect operation over a long period of use, there being but three moving parts, one of which is merely a guide roller to insure perfect meshing between a segmental gear and its pinion.

With the above and other objects in view the invention resides in the particular combination of the parts and the functions of each as hereinafter set forth.

Referring to the drawings.

Figure 1:
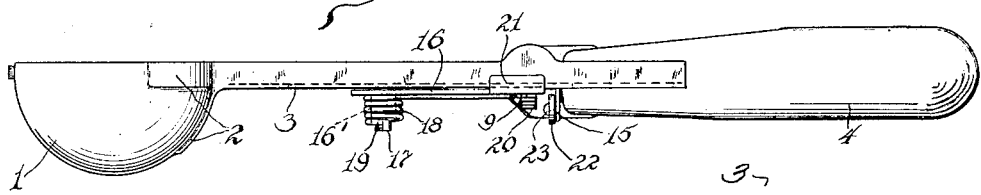
Figure 1 is a side elevation of the preferred form of the disher.
Figure 7:
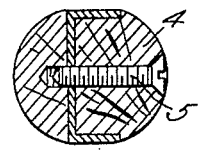
Figure 7 is a section on the line 7—7 of Figure 2.
Figure 2:
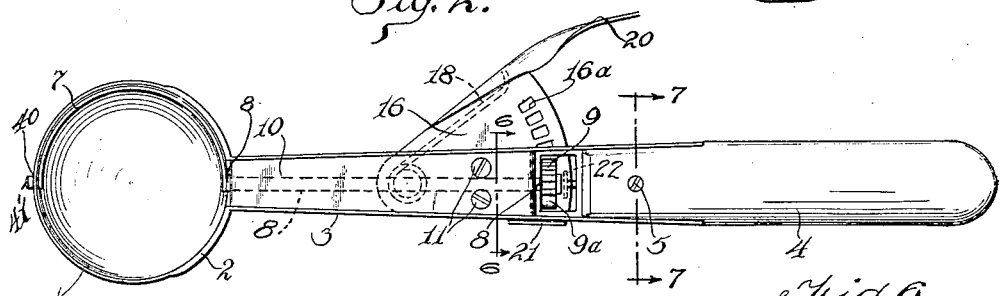
Figure 2 is a plan view of the same.
Figures 3, 6:
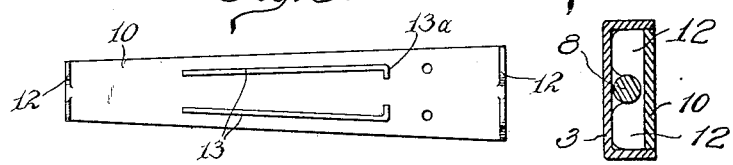
Figure 3 is an enlarged bottom plan view of the housing plate.
Figure 6 is a section on the line 6—6 of Figure 2 with the driving gear removed.
Figure 4:
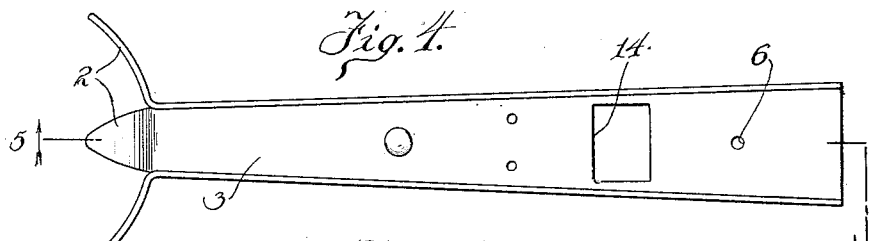
Figure 4 is an enlarged top plan view of the stem plate.
Figure 5:
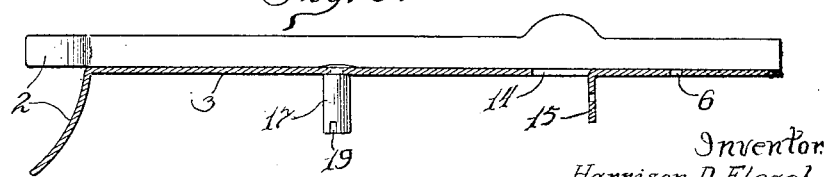
Figure 5 is a longitudinal section on the line 5—5 of Figure 4.

Referring more particularly to the drawings, Figures 1 to 5, my invention comprises the bowl or scoop 1, which is adapted to be supported by the channeled frame 3, which is in turn mounted upon the handle 4. The channeled frame 3 comprises a member stamped from metal plate, preferably sheet steel, having at its left end (Figure 4) the upturned ears 2 of a conformation adapted to fit the exterior of the bowl 1 to which the said ears are fixed by any convenient means, as riveting, soldering, etc., but I prefer to weld the same together. The handle 4 is provided at one end with a longitudinal slot into which is inserted the web of the channeled member 3 in such manner that the hole 6 is aligned with a corresponding hole in the handle 4 through which the handle is attached by means of the screw 5. The handle 4 is of such size and shape to form a close fit within the outer walls of the channeled member 3 and when so assembled the said channeled walls co-operate with the sides of the handle to form a very rigid means of joining the same.

The bowl 1 is provided with a scraper 7 comprising a thin blade member of semi-circular shape pivoted at one end in a hole 40 in the bowl 1 and supported at its other end on the spindle 8. The spindle 8 is adapted to be journaled at the channeled frame 3 by means of a cover plate 10, which comprises a plate member of a width adapted to be received in the said channel, having upturned flanges 12 at both its extremities, the said flanges being adapted to form a journal between pairs of said flanges, when in assembled relation with the channel member 3. The flanges 12 when in assembled relation with the channel 3 are likewise adapted to hold the said cover and the web plate of the channel 3 in parallel spaced relation, forming a tube of substantially rectangular cross section, enclosing and journaling the said spindle. In order to assemble the spindle and its journals, the trunnion 41 on the scraper blade 7 is first placed in the hole 40, the spindle 8 being disposed longitudinally in the center of the channel 3. The cover plate 10 is then placed in the channel 3 with the ears or shoulders 12 disposed on each side of the spindle 8, at each end of the said spindle, and forming a journal therefor. The plate 10 and the channel 3 are held in fixed relation by the screws 11 disposed on either side of the said spindle.

In order to further assist in aligning the spindle 8, the plate 10 may be provided with guides 13 on its underside as well as flanges 12, the guides 13 having laterally turned ends 13a adapted to engage with the spindle 8. The spindle 8 is provided with a pinion 9 which is attached fixedly thereto by riveting or any convenient fastening means and is adapted to rotate the said spindle. In order that the spindle 8 may be journaled in the channel 3, as previously described, with the pinion 9, the channel 3 is provided with a hole 14 to receive the said pinion, the metal removed from said hole 14 being turned up to form a flange 15 adapted to support a roller 22 on a bolt 23 for a purpose further to be described. The channel 3 is likewise provided on its lower or exterior side with a pivot post 17, comprising a stud riveted in said channel and having a slot 19 at its end. In order to actuate the pinion 9 there is pivoted upon the pivot post 17 a flat segmental plate 16 provided with substantially rectangular holes 16a arranged in the arc of a circle about the pivot 17, and adapted to receive the teeth of the pinion 9. The segmental gear plate 16 is provided at its edge with a thumb piece 20 stamped from sheet metal and which may be integral with the plate 16 or which may be formed of a separate piece of metal soldered or riveted to the same. The gear plate 16 is also provided with a spring 18 comprising a helical spring member 18 wound about the pivot post 17, one end being held in the slot 19 and the other end extending tangentially to engage under the thumb piece 20. The plate 16 also is provided with a turned up flange 21 adapted to engage with one side of the channeled member 3 and to limit the motion of the plate 16 by the spring 18, its movement in the opposite direction being limited by the abutment of the thumb piece 20 with the adjacent flanged surface of the frame 3. The roller 22 is adapted to bear on the lower surface of the plate 16, thus not only holding it upon the pivot post 17, but also insuring the proper meshing of the segment 16 with the pinion 9. In order to make the pinion 9 and the plate 16 easy to assemble the pinion 9 is preferably provided with a blank portion for approximately 90° of its circumference so that by assembling the last tooth adjacent said blank portion with the last hole in the plate 16 the scraper 7 is in proper relation with the bowl 1 being disposed around the edge of one side of the bowl and adapted to be moved across the surface of the bowl to the other edge.

The disher is operated in the usual manner by filling the bowl, inverting the disher and manually operating the scraper to dislodge the ice cream from the bowl. Full depression of the thumb piece will rotate the pinion, spindle, and scraper through an angle of 180°, thus freeing the cream from the bowl. The coil spring will return the movable parts to their normal position. The disher has all of its parts readily accessible for thorough cleansing, and the scraper with its spindle may be removed by merely removing the cover plate.

It will be apparent that the frame and actuating parts, with the possible exception of the pinion and the hub on the segmental plate, may be readily stamped from sheet metal, thus making the manufacture of the device very economical and the assembly very simple.

From the foregoing description it will clearly be seen that applicant has provided a simplified construction for dispensers of this nature. The unique arrangement of the parts combined with the simplicity of design is of such nature as to readily adapt itself to wide commercial use.

While I have illustrated and described the preferred form of construction for carrying my invention into effect, this is capable of modification without departing from the spirit of the invention, and I do not wish to be limited to the precise details of construction set forth, but desire to avail myself of all changes within the scope of the appended claims.

What I claim as new and desire to secure by Letters Patent of the United States is defined in the following claims:

1. In a device of the class described, the combination of a stamped metal scoop, a channeled supporting frame, a handle affixed within said channel, cover means for said channel, said cover means forming bearings with said channel for a scraper spindle, a scraper, a spindle, and means to actuate the same from said handle.

2. In a device of the class described, the combination of a stamped metal scoop, a channeled supporting frame having a web, a handle fitted over the web of said channeled member, bearings in said channel, and an integral scraper and spindle journaled in said bearings, and means to actuate said scraper and spindle from said handle.

3. In a device of the class described, the combination of a stamped metal scoop, a channeled supporting frame, a handle affixed within said channel, cover means for said channel, said cover means forming bearings with said channel for a spindle, an integral scraper and spindle journaled in said channel, and means to oscillate said scraper and spindle from said handle.

4. In a device of the class described, the combination of a stamped metal scoop, a channeled supporting frame having an aperture for a pinion, a handle affixed within said channel, cover means for said channel, said cover means forming bearings with said channel for a spindle, an integral scraper and spindle journaled in said channel, a pinion on said spindle, and means to actuate said pinion, spindle and scraper.

5. In an ice cream disher, the combination of a channelled supporting frame of sheet metal having a web and sides, with a handle having a longitudinal slot to receive the end portion of the web of said channel, the portion of said handle in said channel being adapted to contact both sides of said channel, flanges formed at the opposite end of said frame by the web and each side of said channel, a bowl supported by said flanges, a scraper in said bowl and instrumentalities to actuate said scraper.

6. In an ice cream disher, the combination of a channelled supporting frame of sheet metal having a web and sides, with a handle having a longitudinal slot to receive the end portion of the web of said channel, the portion of said handle in said channel being adapted to contact both sides of said channel, flanges formed at the opposite end of said frame by the web and each side of said channel, a bowl supported by said flanges, a scraper having one end journalled in said bowl, a spindle supporting the other end of said scraper, cover means for said channel and having bearings for journalling said spindle and mechanism to oscillate said spindle and scraper.

7. In an ice cream disher, the combination of a channelled supporting frame of sheet metal having a web and sides, with a handle having a longitudinal slot to receive the end portion of the web of said channel, the portion of said handle in said channel being adapted to contact both sides of said channel, flanges formed at the opposite end of said frame by the web and each side of said channel, a bowl supported by said flanges, a scraper having one end journalled in said bowl, a spindle supporting the other end of said scraper, a cover for said channel having upturned ears to provide bearings for said spindle, and actuating means mounted on said frame for oscillating said spindle and scraper.

8. In an ice cream disher, the combination of a channelled supporting frame of sheet metal having a web and sides, with a handle having a longitudinal slot to receive the end portion of the web of said channel, the portion of said handle in said channel being adapted to contact both sides of said channel, flanges formed at the opposite end of said frame by the web and each side of said channel, a bowl supported by said flanges, a scraper having one end journalled in said bowl, a spindle supporting the other end of said craper, cover means for said channel and having bearings for journalling said spindle, a pinion on said spindle, said web having an aperture to receive said pinion, and a sector adapted to operate said spindle and said scraper.

9. In an ice cream disher, the combination of a channelled supporting frame of sheet metal having a web and sides, with a handle having a longitudinal slot to receive the end portion of the web of said channel, the portion of said handle in said channel being adapted to contact both sides of said channel, flanges formed at the opposite end of said frame by the web and each side of said channel, a bowl supported by said flanges, a scraper having one end journalled in said bowl, a spindle supporting the other end of said scraper, cover means for said channel and for journalling said spindle, a pinion on said spindle, actuating means therefor, said web having an aperture to receive said pinion, and upturned ears on the ends of said cover fitting within said channel.

10. In an ice cream disher, the combination of a channelled supporting frame of sheet metal having a web and sides, with a handle having a longitudinal slot to receive the end portion of the web of said channel, the portion of said handle in said channel being adapted to contact both sides of said channel, flanges formed at the opposite end of said frame by the web and each side of said channel, a bowl supported by said flanges, a scraper having one end journalled in said bowl, a spindle supporting the other end of said scraper, cover means for said channel having bearings for journalling said spindle, a pinion on said spindle, said channel having an ear punched out of the same to provide an aperture for said pinion, a gear sector on said frame to actuate said pinion, said ear holding said sector in engagement with said pinion.

11. In an ice cream disher, the combination of a stamped metal scoop, a channelled supporting frame, flanges formed of the web of said channelled frame, and of the sides of the same supporting said scoop, said web having an aperture, a handle fitting in one end of said channel and having a slot to receive the web thereof, a spindle rotatably supported in said channel, a scraper in said bowl on one end of said spindle, a pivot post projecting from the outside of said web, a pinion on said spindle having its teeth projecting through said aperture in said web, and a gear plate on said post to actuate said pinion.

12. In an ice cream dipper, the combination of a bowl, a scraper movable about an axis extending transversely of the bowl, a body member comprising a shank projecting from the bowl, and having a handle, a member for holding the shaft in bearings, one of said members being formed with bearings open at one side, and actuating means for the shaft including a lever pivoted to the body, and having a detachable connection with the shaft.

13. In an ice cream dipper, the combination of a bowl, a scraper movable about an axis extending transversely of the bowl, a shank body projecting from the bowl, a rock shaft on which the scraper is mounted extending in a direction lengthwise of the shank body, and operating means including a lever pivoted to the body, motion transmitting and multiplying mechanism between the lever and the rock shaft, a second body cooperating with said first body to form bearings for said shaft, one of said bodies being formed with bearings open at one side, and the lever and part of the motion transmitting and multiplying mechanism carried by the shaft being detachably connected together.

In witness whereof, I hereunto subscribe my name this 24th day of August, 1926.

HARRISON D. FLEGEL.